March 1, 1938. J. STASINSKI ET AL 2,109,598
ICE CREAM DIPPER, POWER OPERATED
Filed April 30, 1937 3 Sheets-Sheet 1
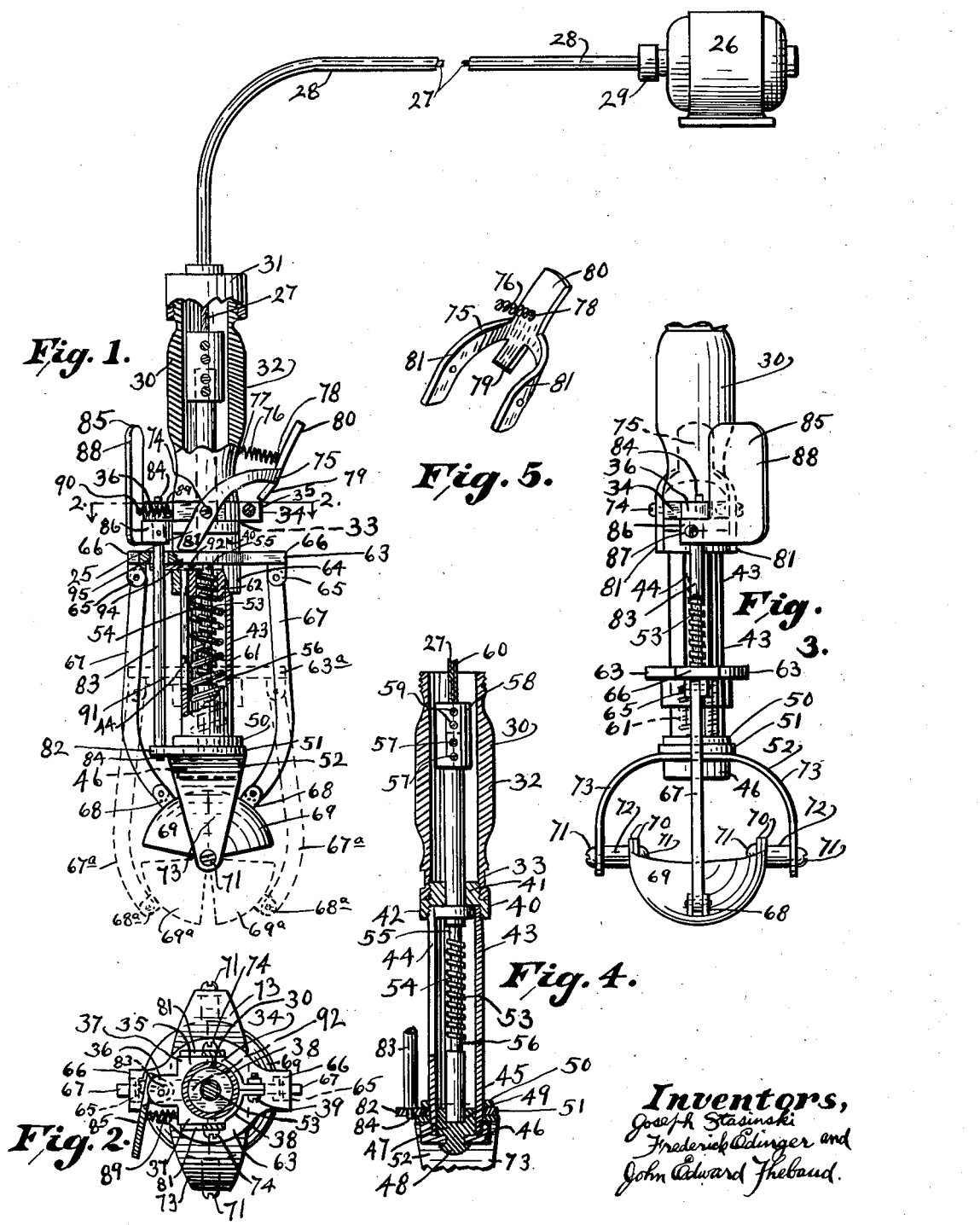
Inventors,
Joseph Stasinski
Frederick Odinger and
John Edward Thebaud.

March 1, 1938.  J. STASINSKI ET AL  2,109,598
ICE CREAM DIPPER, POWER OPERATED
Filed April 30, 1937   3 Sheets-Sheet 2
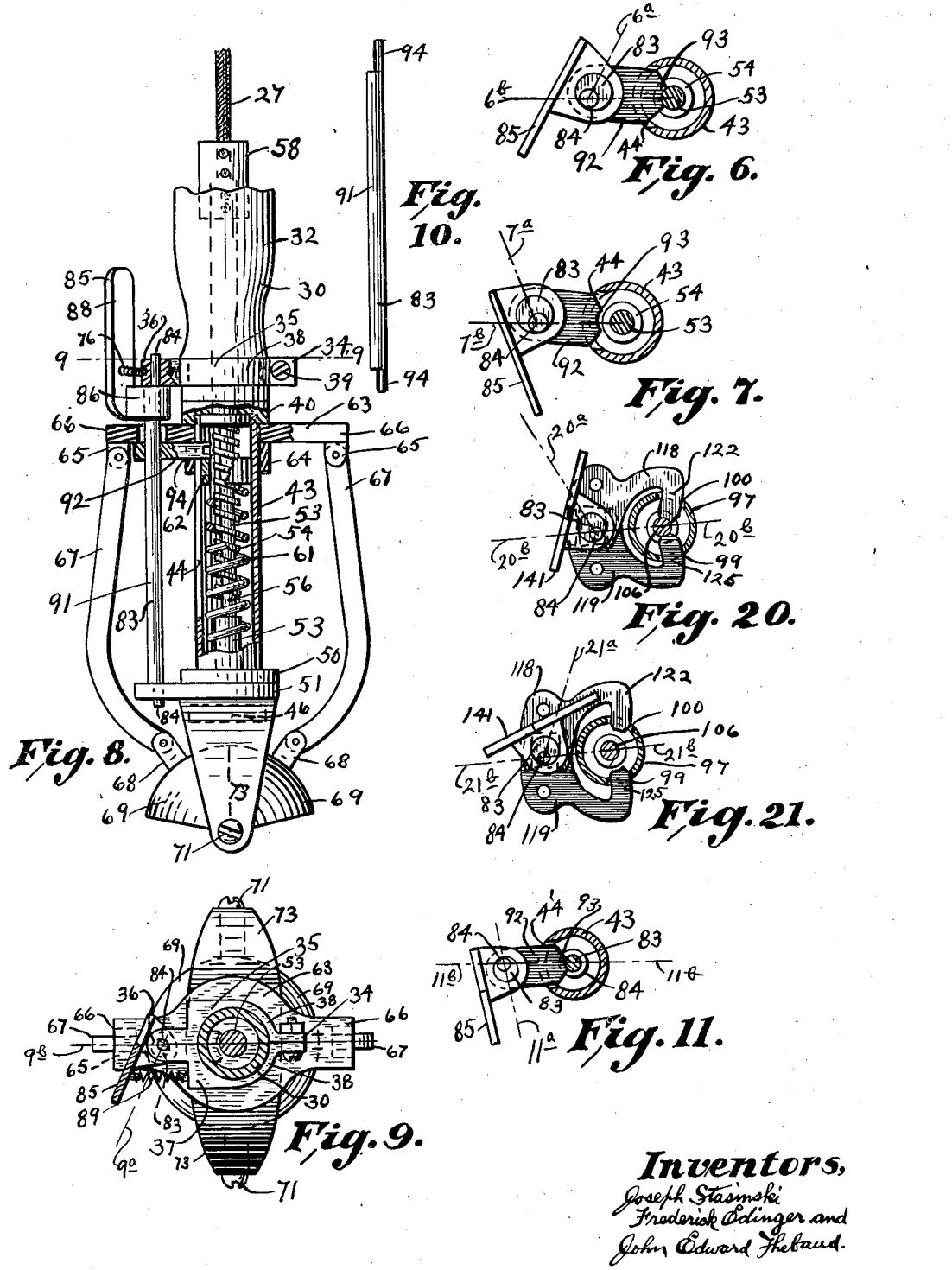
Inventors,
Joseph Stasinski
Frederick Odlinger and
John Edward Thebaud

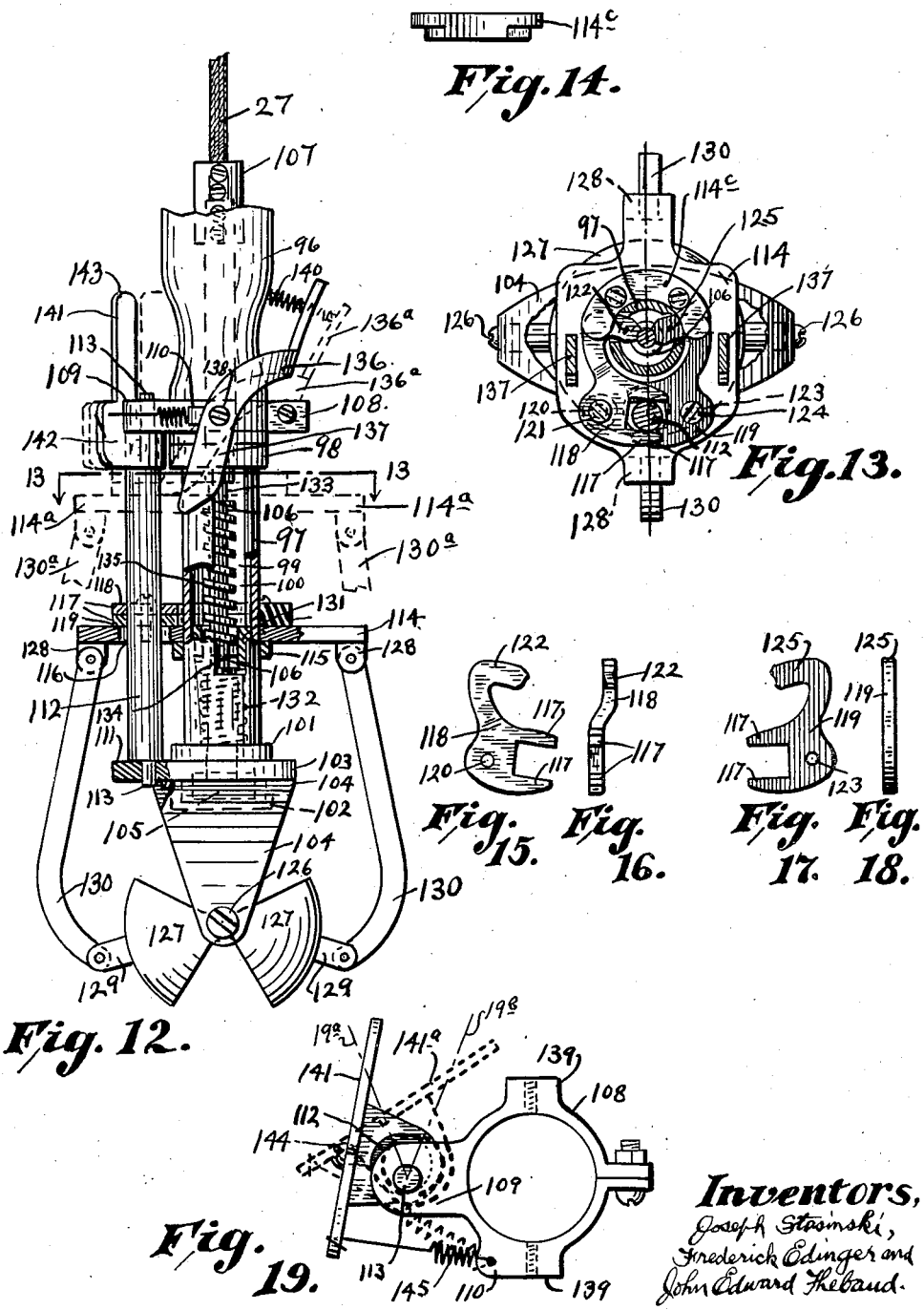

Patented Mar. 1, 1938

2,109,598

UNITED STATES PATENT OFFICE 2,109,598

ICE CREAM DIPPER, POWER OPERATED

Joseph Stasinski, Frederick Edinger, and John Edward Thebaud, Philadelphia, Pa.; said Thebaud assignor of one-sixth to said Stasinski and one-sixth to said Edinger Application April 30, 1937, Serial No. 139,998

7 Claims. (Cl. 107—48)

This invention relates to ice cream dippers, power operated, which are adapted for cutting, shaping and measuring ice cream and other commodities to be dispensed, particularly in small quantities of the same.

Various types of scooping and dispensing devices, of the ice cream dipper-type, have been devised and are now in use for dipping up ice cream from the bulk thereof, taken from a large size can, and then released to be served individually as balls of ice cream, either into dishes, cones, or put into containers.

These common types of dippers are held in the hand of the operator, who forces the dipper into the ice cream, either directly or by the joint movement of the scooping parts of the device moving into the ice cream, in response to a gripping movement of the operator's hand on a lever, at the handle. This requires some effort on the part of the operator, and in the course of repeated dippings, throughout the day, in serving customers, the operator's arm and hand become fatigued.

It is the primary object of our invention to put most of the work of operating the dipper, upon a continuously running motor, having connection with our device, through a flexible shaft. Another object is to provide means adapted to start or stop the working of the same, through intervening mechanism thrown in and out of operating connection with the motor, by the use of operating levers, at the will of the operator, having the operating levers positioned at the handle of the device to be readily accessible to the fingers or thumb, of the hand, holding the device.

A further object of our invention is to provide, in connection with a device, fulfilling the above named objects, a clutch member, adapted to be thrown in or out of engagement with a continuously running screw, which will be adapted to forcibly propel the scooping elements, of the device, into the commodity to be scooped up, such as ice cream.

With these and other objects which will hereinafter appear, our invention resides in certain construction, various embodiments of which are illustrated in the drawings, and are hereinafter described, their operation is explained and what we claim is set forth.

In the drawings,

Figure 1 is a sectional front elevation of one form of our invention, showing the scoops of the device in full open position.

Figure 2 is a horizontal section taken on the line 2—2 of Figure 1.

Figure 3 is a sectional side elevation of the form of our device shown in Figures 1 and 2, but showing the scoops completely closed.

Figure 4 is a vertical mid-sectional elevation of certain associated parts of the device which is shown in Figures 12 and 13.

Figure 5 is a perspective view of the forked starting lever of the device shown in Figures 1, 2 and 3.

Figure 6 is an enlarged sectional plan of the screw engaging pawl and directly associated parts of the device, shown in Figures 1 and 3, and are in engaged position.

Figure 7 is an enlarged sectional plan of the screw engaging pawl and directly associated parts of the device shown in Figures 1 and 3, and are in disengaged position.

Figure 8 is an elevation of a modified form of device differing somewhat from that shown in Figures 1 and 3, and is designed for a different method of operating the engaging of the pawl with the threaded operating shaft.

Figure 9 is a horizontal section taken on the line 9—9, of Figure 8.

Figure 10 is an elevation of the cam shaft per se, for governing the position of the screw engaging pawl.

Figure 11 is an enlarged sectional plan of the screw engaging pawl and directly associated parts of the device shown in Figures 8 and 9 for an engaged position.

Figure 12 is a sectional elevation of another form of our invention, including two simultaneously operating screw engaging pawls.

Figure 13 is a section taken on the line 13—13, of Figure 12.

Figure 14 is a front elevation of a pawl covering cap, for that form of device, shown in Figures 12 and 13.

Figure 15 is a top plan, and Figure 16 is a side elevation of one of the two L-pawls, of the device shown in Figures 12 and 13.

Figure 17 is a top plan, and Figure 18, is a side elevation of the other of the two said L-pawls.

Figure 19 is a top plan of a handle bracket with directly associated cam shaft and finger lever, used in the device shown in Figures 12 and 13.

Figure 20 is an enlarged sectional plan of the two screw engaging pawls and directly associated parts of the device shown in Figures 12 and 13, and are in engaged position with the threaded shaft.

Figure 21 is an enlarged sectional plan of the two screw engaging pawls and directly associated parts of the device shown in Figures 12 and 13, and are in disengaged position with the threaded shaft.

Of the three forms of our device shown in the figures, the form shown in Figures 1 and 3, is designed to be thrown into operation with the continuously running shaft, by a push-off lever, and released by a second lever. The form of device shown in Figures 8 and 9 is designed to be thrown in operation or released by the same lever. The form of device shown in Figures 12 and 13, with two screw engaging pawls, acting in unison, has a push-off lever and a second lever for respectively engaging and disengaging the pawls with the running screw, in the same manner as used in connection with the device shown in Figures 1 and 3.

In the figures, considering first, the device and parts shown in Figures 1, 2, 3, 4 and 5, the device 25 is shown connected with the electric motor 26, by the flexible cable shaft 27, having an outer, non-rotating covering 28. The covering 28 is releasably attached by a coupling 29, to the motor 26, and at its other end is attached to the handle 30, of the device 25, by the coupling 31. The handle 30 has a hand receiving portion 32, and has an annular groove 33, at its lower end, adapted to receive a bracket 34, which has a body portion 35, with a bearing extension 36, and shoulders 37. The shoulders 37 have curved arm extensions 38, fitting around the groove 33, and have their ends drawn together by the bolt 39, serving to bind the bracket 34 to the handle 30. Screwed into the lower end of the handle 30, is the nut 40, (See Figure 4), having a threaded portion 41, directly engaging the handle 30, and a threaded tube receiving portion 42, engaged by the tube 43, which has a longitudinal slot 44 running part way down the tube. The lower end 45, of the tube 43, is in threaded engagement with the cap 46, which has fixed within it, the centrally positioned bearing 47, having the head 48 riveted over. This bearing 47 has a central bearing pocket 49. Fixed near the lower end of the tube 43 is a collar 50, against which, is the bearing plate 51, surrounding the tube 43, and next to it is the shell holding bracket 52, together held on the tube 43, by the cap 46.

Journaled in the nut 41 and the bearing 47, is the threaded shaft 53, having a threaded portion 54, extending between the upper annular groove 55 and the lower annular groove 56. To the upper end of the shaft 53 is fixed, by screws 57, the coupling 58, which is also fixed by screws 59, to the end 60, of the flexible cable shaft 27. Surrounding the threaded portion 54, of the shaft 53, is a coiled compression spring 61, seated against the bearing 47, and presses up against an inner ring 62, in sliding engagement with the inner wall of the tube 43. This ring 62 is preferably made long enough to maintain its axial alignment with the tube 43, when pressed down at one side by the screw engaging pawl. In sliding engagement with, and surrounding the tube 43, is the yoke 63, having a depending collar 64, fixed thereto, to be in sliding engagement with the tube 43. The collar 64 is made long enough to maintain its axial alignment with the tube 43. The yoke 63, has ears 65 depending from its ends 66. Pivoted to the ears 65, are the links 67, having their lower parts curved inwardly and having their lower ends pivoted to the ears 68, fixed upon the spherically shaped shells 69. Each of the shells 69, has an extension 70, on each side thereof, journaled upon a screw 71, passing through tubular pieces 72, which are fixed to the curved arms 73, of the bracket 52.

Pivotally mounted upon the bracket 34, by screws 74, is the forked lever 75, normally pressed outward by the spring 76, which engages a pin 77, on the handle 30, and a pin 78, on the lever 75. The lever 75 has a stop extension 79, adapted to register in contact with the yoke bracket 35. 80 is the finger engaging portion, of the lever 75. The leg portions 81, of the lever 75, normally reach down into contact with the yoke 63, in its uppermost position.

In journaled engagement with the bearing extension 36, of the bracket 34, above, and below in journaled engagement with the bearing extension 82, of the bearing plate 51, is the camming shaft 83, with its reduced, eccentrically positioned extensions 84, journaled in the said extensions 36 and 82. Just below the bracket extension 36, and in fixed engagement with the shaft 83, is the finger lever 85, having its body portion 86, surrounding the shaft 83, and fixed thereto, by a screw 87. 88 is an upstanding finger portion, of the lever 85, normally pressed outward from one of the shoulders 37, by the compression spring 89, engaging pins 90, at each end thereof, fixed in the finger lever 85 and the shoulder 37, which it engages. The shaft 83 is cylindrical, although eccentrically mounted at its ends, in fixed bearings, already referred to above. In sliding engagement with the cylindrical portion 91, of the camming shaft 83, is the toothed pawl 92, having its toothed end 93 adapted to be thrown, by the turning of the camming shaft 83, against the shaft 53. This pawl 92, passes through a horizontal slot 94, between the collar 64 and the yoke 63, and also through the vertical slot 44 of the tube 43, and is in bearing engagement with the inner spring pressed ring 62. The pawl 92 is in sliding engagement with the vertical slot 44. The shaft 83 passes through an enlarged hole 95, in the yoke 63. The particular eccentric mounting of the camming shaft 83, in its bearings, is described below, in connection with the operation of this form of our invention.

Referring now to the form of our device shown in Figures 8 and 9, parts similar to parts of the form of our device shown in Figures 1, 2, and 3, are similarly numbered, but the forked lever 75, of the device shown in Figures 1, 2 and 3, is omitted from the device shown in Figures 8 and 9, inasmuch as the camming shaft 83, is differently mounted in its eccentric relation to the bearing brackets in which it is journaled, so that a turning of the finger lever 85 from its normal position, causes an engagement of the toothed pawl 92, with the shaft 53, instead of a release therefrom, as in the device shown in Figures 1, 2 and 3. This positioning of the finger lever 85 and the pawl 92, is discussed below in connection with the operation of the device shown in Figures 8 and 9.

Considering next the form of device shown in Figures 12 and 13, the main parts are similar to those shown in Figures 1 and 8, of the other two forms of our device, but on account of modifications and additions, we have numbered the parts shown in Figures 12 and 13, differently.

As shown in Figures 12 and 13, the handle 96 is connected with the double-slotted tube 97, by the nut or bushing 98. The tube 97 has two oppositely disposed, longitudinal slots 99 and 100. 101 is a collar integral with the lower part of the tube 97. A cap nut 102 is connected with the lower end of the tube 97 and binds between it and the collar 101, the bearing plate 103 and the curved shell bracket 104, both of which surround the tube 97. The cap nut 102, has a central bearing 105, integral therewith. In this bearing 105, is journaled the lower end of the threaded shaft 106, which is in journaled engagement with the bushing 98, passing up through the same. The upper end of the shaft 106 is connected with the flexible shaft cable 27, by the coupling 107, within the handle 96. Mounted transversely to the lower end of the handle 96, is the bearing bracket 108, having a bearing extension 109, and a spring holding lug 110.

Journaled above, in the bearing extension 109, of the bracket 108, and below, in the bearing extension 111, of the plate 103, and eccentrically positioned relative to its bearings, is the camming shaft 112, with reduced eccentric extensions 113, journaled in the said extensions 109 and 111. In sliding engagement with the tube 97, is the yoke 114, with its depending collar 115. The shaft 112, passes through an enlarged hole 116, in the yoke 114, and engages the forked ends 117, of the L-levers 118 and 119, on top of the yoke 114. A cap 114c extends over the swinging ends of the L-levers 118 and 119, to slidingly hold them against the yoke 114. The L-lever 118 has a pivot hole 120, through which loosely passes the screw 121, into the yoke 114. The L-lever 118 has a pawl portion 122, turned in through the slot 99, and is adapted to releasably engage the threaded portion, of the shaft 106. The L-lever 119 has a pivot hole 123, through which loosely passes the screw 124, into the yoke 114. The L-lever 119 has a pawl portion 125, turned in through the slot 100, and is adapted to releasably engage the threaded portion of the shaft 106. The pawl portions 122 and 125, act in unison, through the engagement of the fork ends 117, of the L-levers with the camming shaft 112. Pivotally mounted on screws 126, in connection with the shell bracket 104, are the two curved shells 127. Depending from the yoke 114, are the ears 128, fixed thereto. Fixed centrally upon the outside of the shells 127, are the ears 129. Links 130, pivotally connect the ears 128, with the ears 129. The pawl portions 122 and 125, of the L-levers 118 and 119, are adapted to bear in contact with the inner ring 131, which is in sliding engagement with the inner wall of the tube 97. The ring 131, is urged upward by the compression spring 132, which surrounds the shaft 106, within the tube 97. The shaft 106 has an upper annular groove 133, and a lower annular groove 134, where the pawl engagement with the shaft 106 is free from the longitudinal action of the threaded portion 135, of the shaft 106, when it turns. For pushing down the yoke 114 into pawl engaging position, the forked lever 136, is provided, and has leg portions 137, pivotally mounted upon screws 138, fixed on the side lugs 139, of the bearing bracket 109. A compression spring 140, normally holds the forked lever 136, in the broken line position 136a, as the yoke 114 is in its uppermost position 114a. At the upper end of the camming shaft 112, and just below the bearing extension 110, is fixed the finger lever 141, with a body portion 142 and a finger portion 143. The shaft 112 passes into the body portion 142. The screw 144 fixes the lever 141 to the shaft 112. A tension spring 145 connects the lever 141 with the lug 110 and normally causes the camming shaft 112 to bring the L-levers 118 and 119 into the shaft contacting position, shown in Figure 13. The line 146—146, passes through the axes of the camming shaft 112 and the threaded operating shaft 106, and is not meant for a section line.

In operation, considering first the form of our device shown in Figures 1, 2, 3, 4 and 5, as shown in full lines in Figures 1 and 3, the device is in full open position ready to be held in the hand of the operator, and pressed into the surface of the bulk of ice cream in a container. Once the operator has positioned the device to scoop up the ice cream, then with the motor 26 running and turning the flexible shaft cable 27 and the threaded shaft 53, while the pawl 92 idles in the upper annular groove 55, the operator passes the end 80, of the forked lever 75, toward the handle 30, causing the legs 81, to push the yoke 114 down, to bring the pawl 92, into engagement with the threads 54, of the shaft 53, which at the time is turning in a direction to cause the threads 54 to carry the engaged pawl 92, down with the yoke 63, until the lower annular groove 56, of the shaft 53, is reached, and here the pawl 92 idles until released by the turning of the camming shaft 83, against the pressure of the spring 36, acting on the finger lever 85, which is moved by the operator to release the pawl 92 from engagement with the shaft 53, so that the spring 61, previously compressed during the scooping operation, is freed to return the parts to normal open position.

During the downward movement of the yoke 63, the links 66, force the shells 69 to turn down and cut into the ice cream, forming a ball of the portion so dislodged from the bulk thereof. We have shown the closing position of the shells 69, and connected parts, by broken lines, and for this position the yoke 63 is indicated in its low position, at 63a, the shells at 69a, and the links at 67a. Referring in this connection to Figures 6 and 7, in Figure 6, the pawl 92 is shown engaging the threaded shaft 53, when the eccentric position of the camming shaft 83 is such as to have the plane which passes through the axis of the cylindrical body 91, of the shaft, and through the axes of the journaled ends 84, of the shaft 83, also pass through the line 6a. For these relative positions of the parts, and the angular relation of line 6a to line 6b, passing through the axis of the body 91 of the shaft 83 and the axis of the shaft 53, the pawl 92 will either be idling in either of the annular grooves 55 and 56, or will be engaging the threads 54, when the pawl 92 has been lowered with the yoke 63, to bring them opposite the threads 54.

Figure 7 shows the changed position of the line 6a, of Figure 6, crossing the axes to the position of 7a, relative to the line 7b, in this figure, resulting in a release of the pawl 92, from the shaft 53. In Figure 6, the finger lever 85 is in a position normally held so, by the spring 76, of Figures 1 and 2, while in Figure 7, the position of the lever 85 is that to which it is moved, when releasing the pawl 92.

We have just described a form of our device requiring the use of two finger levers to carry out a method of operation, whereby the operator is not required to hold either finger lever in strained position, except long enough to carry out the functioning of the parts in a scooping or a releasing action. This method of operation enables the operator to so control the device, as to permit him to leave the device resting either with the pawl 92 idling in the annular groove 55, with the shells 69 fully open, or to leave the device holding its scooped-up ball of ice cream, until he releases it by moving the lever 85, all while the motor continues to run and turn the threaded shaft 53.

With the form of our device shown in Figures 8 and 9, we have all parts similar to those illustrated and described pertaining to Figures 1, 2 and 3, except here we have omitted the forked lever 75, and have changed the position of the eccentric relation of the camming shaft 83, to the other parts, so as to have the pawl 92, normally held in released position with respect to the threaded shaft 53. In Figure 9, the line 9ª crosses through the axis of the body portion 91, of the camming shaft 83, and the axes of the journaled ends 84, for the normally released position of the pawl 92, with respect to the shaft 53. In Figure 11, the position of the lever 85, is that into which this lever is forced, against the action of the spring 76, when engaging the pawl 92, with the shaft 53. For this strained position of the lever 53, we have shown the line 11ᵇ, relative to the line 11ᵇ, as crossing through the axis of the body portion 91, and the axis of the journaled end 84 of the shaft 83. When using the form of device shown in Figures 8 and 9, the operator places the open shells 69 against the surface of the ice cream which is in bulk, next, he moves the lever 85 to cause the engagement of the pawl 92, with the threads 54 of the shaft 53, there being in this case no annular groove 55 provided or needed—and with the shaft 53 revolving by its connection with the running motor 26, the engaged pawl 92, with the yoke 63, will move downward, and the shells 69 will scoop up a ball of ice cream, when the threads 54, of the shaft 53, are right or left, as required for this down movement, by the direction of turning of the motor, to which it is connected. When the pawl 92 has reached the annular groove 56, it will there idle in engagement, as long as the lever 85 is held for such engagement by the operator, with the scoop shells 69 closed, holding its ball of ice cream. The operator in this case, continues to hold the lever 85 in strained position, until he has brought the device, with its charge, directly over the dish, carton or cone, into which he wishes to deposit the ice cream ball, when he will release the lever 85, leaving the spring 89 free to turn the lever 85, and the shaft 83, to release the pawl 92, from engagement with the shaft 83. The spring 61, which had been previously compressed by the bearing down of the pawl 92 on the ring 62, and it in turn on the spring 61, will move the parts back to full open position. So accordingly as we position the shaft 83, with reference to positioning the plane passing through the axis of the body 91 of the shaft, and the axes of its journaled and eccentrically positioned ends, we can cause either a normal engagement of the pawl 92, with the shaft 53, or a normal disengagement therewith.

Considering now the form of our device shown in Figures 12, 13, 14–19, here we have a device much similar to the other forms illustrated and described, except that we have strengthened the pawl engagement with the threaded shaft, by having a double engagement thereof. In this case, the eccentric movement of the shaft 112, in sliding engagement with the forked ends 117, of the pivoted L-levers 118 and 119, causes a small angular movement to these L-levers, enough to cause the engagement or the disengagement of the respective pawl portions 122 and 125, with respect to the threaded shaft 106. In Figure 12 the parts of the device are shown relatively positioned part way down, with the pawl portions 122 and 125 normally engaged with the threads 135, of the shaft 106, being so held by the spring 145, pulling on the finger lever 141, to turn the camming shaft 112 into the full line position shown in Figure 19, relative to the bracket 108, the engaging position of the pawl portions as shown in Figures 13 and 20, where in Figure 20, the line 20ª passes through the axis of the body portion of the camming shaft 112 and the axes of the journaled ends 113. The line 20ᵇ passes through the axis of a journaled end 113 and the threaded shaft 106.

In Figure 21, the pawl portions 122 and 125, of the respective L-levers 118 and 119, are shown in released position, with the line 21ª, which passes, like the line 20ª, through the axis of the body of the shaft 112, and the axes of the journaled ends 113, making a different angle with the line 21ᵇ, than the line 20ª makes with the line 20ᵇ. The line 21ᵇ passes through the axes of the two shafts 106 and 112, (the body portion thereof).

It is obvious that the form of our device shown in Figures 12 and 13, can be made to function like the form of device shown in Figures 8 and 9, by changing the eccentric position of the camming shaft 112, and by leaving off the forked lever 136.

With the use of any of the forms of our device illustrated and described in the manner indicated, the operator, besides holding the device in his hand, with the motor running, is relieved of the effort needed to force the scooping shells into the ice cream, and has simply to manipulate the engaging and releasing levers, in an easy way. He is not concerned with turning the motor switch on or off, each time he applies the device to scoop up the ice cream, or releases the ball thereof. He simply moves a lever to engage or disengage the threaded shaft, as he desires, leaving the motor to run on, ready for engaged action at any time he is called upon to serve a customer. Another advantage in using any of these power operated devices, is in having sufficient power at hand to operate it in scooping up somewhat hardened ice cream, which is difficult to separate into a lump by the use of ordinary hand scoops.

Other forms of our device can be made than those shown and described without departing from the spirit and scope of our invention, we therefore wish to include all forms thereof which come within the purview of the following claims.

We claim:

1. In a device adapted for scooping up a penetrable commodity, such as ice cream, and having a body, operating scoops and operating levers, the combination with a power driven, threaded shaft, journaled in said body, of a releasable pawl operable by said levers, for engaging and disengaging said threaded shaft, to operate the said scoops, by means of the longitudinal movement imparted to said pawl by said threaded screw.

2. A device adapted to scoop up a penetrable commodity, comprising, a body, a handle portion to said body, a straight guiding portion to said body, a pair of co-acting scoops pivotally mounted upon said body, a sliding member positioned to slide along said guiding portion, intervening mechanism connecting said scoops with said member, a threaded shaft journaled upon said body, in a position to be parallel with said straight guiding portion, said shaft being adapted to be motor driven, a pawl movable on said member and adapted to releasably engage the threads of said shaft, for a longitudinal movement, a second member on said body, in sliding engagement with said pawl and adapted to releasably engage the same pawl with said threaded shaft, and an operating lever connected with said second member, for moving the latter to position said pawl relative to said shaft.

3. A device adapted to scoop up a penetrable commodity, comprising, a body, a handle portion to said body, a straight guiding portion to said body, a pair of co-acting scoops pivotally mounted upon said body, a sliding member positioned to slide along said guiding portion, intervening mechanism connecting said scoops with said member, a threaded shaft journaled upon said body, in a position to be parallel with said straight guiding portion, said shaft being adapted to be motor driven, a plurality of separately disposed pawl elements, mounted for movement upon said sliding member, and positioned to releasably engage the threads of shaft, at spaced points around its periphery, a second member on said body in sliding engagement with all of said pawls and adapted to releasably position said pawls, to engage the same simultaneously with the threads of said shaft, and an operating lever connected with said second member, for moving the latter to position all of said pawl relative to said shaft.

4. In a device made in accordance with claim 1, means forming an annular idling groove on said shaft for said pawl, when it is engaged thereby.

5. A device made in accordance with claim 2, wherein said shaft has an annular idling groove for said pawl, when it is engaged thereby.

6. A device made in accordance with claim 3, wherein said shaft has an annular, idling groove for said pawls, when it is engaged thereby.

7. A device of the class described having in combination, a body, a handle portion to said body, including a straight guide extension to said handle portion, positioned to be in parallel alignment with the axis of said handle portion, spaced bearings in said body positioned to have their axes in alignment, a power driven threaded shaft, journaled in said bearings, a motor, a second shaft connecting said motor with said first mentioned shaft, a member in sliding engagement with said guide extension, a movable pawl on said member positioned to releasably engage the threads of said first mentioned shaft, said first mentioned shaft having an annular groove at each end of its threaded portion, positioned where the said pawl engages said shaft at each end of its full travel, scoop means pivotally mounted upon said body, beyond said guide extension, intervening mechanism connecting said member with said scoop means, a spring for normally holding the parts of said device to have said scoop means open, a second member, movably mounted on said body, in sliding engagement with said pawl, adapted to position said pawl in releasable engagement with said first mentioned shaft, an operating lever on said second member, and a second operating lever for manually bringing said pawl from its engagement with an idling groove of said first mentioned shaft, at its initial position, into engagement with the threads of this first mentioned shaft during the turning of the same by said motor.

JOSEPH STASINSKI.
FREDERICK EDINGER.
JOHN EDWARD THEBAUD.